(12) United States Patent
Lee et al.

(10) Patent No.: US 9,294,183 B2
(45) Date of Patent: Mar. 22, 2016

(54) DISTRIBUTED WIRELESS TRANSMISSION AND RECEPTION SYSTEM, AND EXPANDED WIRELESS NETWORK

(71) Applicants: Seongmin Lee, Daejeon (KR); Sukho Lee, Daejeon (KR); Duckjoong Kim, Daejeon (KR); Yongsin Kim, Daejeon (KR); Jaeseang Lee, Daejeon (KR); Hyungseok Choi, Sejong (KR); Dhongwoon Jang, Daejeon (KR); Haehyeon Baek, Daejeon (KR)

(72) Inventors: Seongmin Lee, Daejeon (KR); Sukho Lee, Daejeon (KR); Duckjoong Kim, Daejeon (KR); Yongsin Kim, Daejeon (KR); Jaeseang Lee, Daejeon (KR); Hyungseok Choi, Sejong (KR); Dhongwoon Jang, Daejeon (KR); Haehyeon Baek, Daejeon (KR)

(73) Assignee: AGENCY FOR DEFENSE DEVELOPMENT (KR)

( * ) Notice: Subject to any disclaimer, the term of this patent is extended or adjusted under 35 U.S.C. 154(b) by 72 days.

(21) Appl. No.: 14/352,067

(22) PCT Filed: Oct. 16, 2012

(86) PCT No.: PCT/KR2012/008436
§ 371 (c)(1),
(2) Date: Apr. 16, 2014

(87) PCT Pub. No.: WO2013/058518
PCT Pub. Date: Apr. 25, 2013

(65) Prior Publication Data
US 2014/0248835 A1  Sep. 4, 2014

(30) Foreign Application Priority Data
Oct. 19, 2011 (KR) .................. 10-2011-0107204

(51) Int. Cl.
*H04B 7/15* (2006.01)
*H04B 7/14* (2006.01)
(Continued)

(52) U.S. Cl.
CPC .............. *H04B 7/14* (2013.01); *H04W 88/04* (2013.01); *H04B 7/2606* (2013.01); *H04W 84/18* (2013.01)

(58) Field of Classification Search
USPC ............ 455/3.02, 427, 428, 430, 431, 7–9, 455/11.1, 12.1, 13.1, 13.2, 14–17; 370/226, 370/293, 246, 274, 279, 315, 316, 492, 401
See application file for complete search history.

(56) References Cited

U.S. PATENT DOCUMENTS 5,392,354 A * 2/1995 Takahashi ................ H04K 1/04
380/270
6,665,521 B1 * 12/2003 Gorday .................. H04B 7/022
340/7.2
(Continued)

FOREIGN PATENT DOCUMENTS

KR  10-2009-0068297  6/2009
KR     2009 0068297  6/2009
(Continued)

OTHER PUBLICATIONS

International Search Report and Written Opinion mailed Mar. 27, 2013 in corresponding PCT International Application No. PCT/KR2012/008436.
(Continued)

*Primary Examiner* — Dominic E Rego
(74) *Attorney, Agent, or Firm* — Ostrolenk Faber LLP

(57) ABSTRACT

The present invention relates to a distributed transmission and reception system, and an expanded wireless network. The distributed transmission and reception system according to one embodiment of the present invention comprises a distributed transmission system, a distributed reception system, and a distributed relay system. A source signal of a source radio is divided into a plurality of signals through the distributed transmission system, is relayed through an associate's radio, and can be distributed into and transmitted to other networks which are located out of a distance range. A destination radio positioned in another network can restore the original signal of the outgoing radio with the help of relay from the associate's radio via the distributed reception system. The associate's radio providing help in relay amplifies only a part of the source signal, and thus the intensity of the signal can be enhanced. Accordingly, when the outputs of associate's radio providing help in relay are combined, the combined associate's radio function as a high-power radio, and thereby having a greater capability than the original distance range capability. When a distributed transmission system and a distributed reception system operate within one network, a distributed relay system is constructed. The distributed relay system relays a signal arriving at another network to be transmitted to yet another network, thereby consequentially, expanding a wireless network area.

14 Claims, 5 Drawing Sheets

(51) Int. Cl.
*H04W 88/04* (2009.01)
*H04B 7/26* (2006.01)
*H04W 84/18* (2009.01)

(56) References Cited

U.S. PATENT DOCUMENTS

| | | | | |
|---|---|---|---|---|
| 8,175,463 | B2* | 5/2012 | Elberbaum | G08C 23/06 398/110 |
| 8,213,350 | B2* | 7/2012 | Courseille | H04B 7/18536 370/315 |
| 8,340,591 | B2* | 12/2012 | Lin | H04B 7/15507 370/315 |
| 2003/0185287 | A1* | 10/2003 | Ogawa | H04B 3/36 375/211 |
| 2005/0105908 | A1* | 5/2005 | Oikawa | H04B 10/27 398/85 |
| 2008/0049665 | A1* | 2/2008 | Sakata | H04W 84/18 370/328 |
| 2009/0040961 | A1 | 2/2009 | Ue et al. | 370/315 |
| 2009/0312919 | A1* | 12/2009 | Foster | A01D 41/127 701/50 |
| 2010/0042297 | A1* | 2/2010 | Foster | A01B 79/005 701/50 |
| 2012/0294224 | A1* | 11/2012 | Silva | H04B 7/15521 370/315 |

FOREIGN PATENT DOCUMENTS

| | | |
|---|---|---|
| KR | 10-2011-0041271 | 4/2011 |
| KR | 2011 0041271 | 4/2011 |

OTHER PUBLICATIONS

Yuh-Shyan Chen et al., "A multiple relay-based medium access control protocol in multirate wireless ad hoc networks with multiple beam antennas," International Journal of Communication Systems, vol. 23, pp. 596-632, Apr. 8, 2009.

International Preliminary Report on Patentability (IPRP) issued by the IPEA/EP Patent Office on Apr. 22, 2014 in connection with corresponding application PCT/KR2012/008436.

Chen, et al., A Multiple Relay-Based Medium Access Control Protocol in Multirate Wireless Ad Hoc Networks with Multiple Beam Antennas. Int'l Journal of Communication Systems, vol. 23, Issue 5, pp. 596-632, Feb. 8, 2009.

* cited by examiner

DISTRIBUTED WIRELESS TRANSMISSION AND RECEPTION SYSTEM, AND EXPANDED WIRELESS NETWORK

CROSS-REFERENCE TO RELATED APPLICATIONS

The present application is a 35 U.S.C. §§371 national phase conversion of PCT/KR2012/008436, filed Oct. 16, 2012, which claims priority to Korean Patent Application No. 10-2011-0107204, filed Oct. 19, 2011, the contents of which are incorporated herein by reference. The PCT International Application was published in the Korean language.

TECHNICAL FIELD

The present disclosure relates to a distributed wireless transmission and reception system, and more particularly, to a distributed wireless transmission and reception system using a plurality of radios and an expanded wireless network using the same.

BACKGROUND ART

In order to expand a communication area of a first network when the first network performs wireless communication with a second network located outside, there may be used a method of using a relay technology, a method of enhancing the transmission power of a radio to increase a distance range of the radio, thereby allowing the two networks to be connected to each other, and the like.

Cooperative communication technology is a technology, in which the same transmission data is transmitted through different paths, respectively, using a plurality of relay devices, to allow the reception side to select one of a plurality of signals or effectively combine the plurality of signals, thereby enhancing link reliability and quality, wherein a diversity effect is used.

In general, when a first network performs wireless communication with a second network located outside, a signal is easily transmitted if the second network is within a distance range of the first network, but the signal is transmitted in a difficult way if it is out of the distance range. At this time, in order to transmit a signal to the second network located out of the distance range, it has a problem in that the first network should transmit the signal using a radio with high output power.

DISCLOSURE OF THE INVENTION

An aspect of the present disclosure is to provide to a distributed wireless transmission and reception system capable of transmitting a signal to an outside network located out of a distance range without using a relay or high-power radio, and an expanded wireless network thereof.

A distributed wireless transmission and reception system according to the present disclosure may include a distributed transmission system, a distributed reception system, and a distributed relay system.

A distributed transmission system according to an embodiment of the present disclosure may include a source radio configured to output a transmission signal, and select first jump relay radios corresponding to the number of signal groups when the transmission signal is divided into a plurality of signal groups, and designate a signal group to be transmitted by the first jump relay radios, respectively, and the first jump relay radios configured to extract the designated signal group from the transmission signal output out of the source radio, and transmit the extracted signal group to an external network containing each destination radio.

According to an embodiment, the distributed transmission system may further include a first jump source radio configured to receive the transmission signal from the source radio, and transfer the transmission signal to the first jump relay radios.

According to an embodiment, the source radio, the first jump source radio and the first jump relay radios may belong to the same network.

According to an embodiment, the source radio may set up a link to the external network containing the destination radio, and exchange an address with the destination radio.

According to an embodiment, the source radio may set up a link to the external network or transmit data to the external network using orthogonal frequency division multiplexing (OFDM).

According to an embodiment, the first jump relay radios may selectively amplify the extracted signal groups, respectively, to transmit them to the external network containing the destination radio.

A distributed reception system according to an embodiment of the present disclosure may include second jump relay radios configured to receive a plurality of signal groups from the outside, a first destination radio configured to receive the plurality of signal groups, respectively, from the second jump relay radios to restore a transmission signal using the received signal groups, and a destination radio configured to receive the restored transmission signal from the first jump destination radio.

According to an embodiment, the destination radio, the first jump destination radio and the second jump relay radios may belong to the same network.

According to an embodiment, the first jump destination radio may combine the received signal groups to restore the transmission signal.

A distributed relay system according to an embodiment of the present disclosure may include third jump relay radios configured to receive a plurality of signal groups from the outside, a second destination radio configured to receive the plurality of signal groups, respectively, from the third jump relay radios to restore a transmission signal using the received signal groups, a second jump source radio configured to receive the restored transmission signal from the second jump destination radio, and fourth jump relay radios configured to receive the transmission signal from the second jump source radio, extract a predesignated signal group from the transmission signal, and transmit the extracted signal group to an external network containing each destination radio.

According to an embodiment, the second jump destination radio, the second jump source radio, the third and fourth jump relay radios may belong to the same network.

According to an embodiment, the source radio may receive the transmission signal in a form that the signal groups are restored.

An expanded wireless network according to an embodiment of the present disclosure may include the distributed transmission system, the distributed reception system, and the distributed relay system, wherein the distributed transmission system is connected to a wireless network separated therefrom using radios.

A distributed transmission system according to an embodiment of the present disclosure may transmit a plurality of signal groups to a second network using the first jump relay radios of a first network, thereby summing each transmission power of the first jump relay radios. As a result, it may be possible to enhance a distance range of the first network.

Accordingly, a signal may be transferred to the second network out of the distance range using a plurality of low power radios even without using a radio with high power in the first network.

When a distributed transmission system and a distributed reception system according to an embodiment of the present disclosure are carried out within one network, a distributed relay system may be established. The distributed relay system may relay a signal that has been received from another network to still another network, thereby expanding a wireless network region.

MODES FOR CARRYING OUT THE PREFERRED EMBODIMENTS

Figure 1:
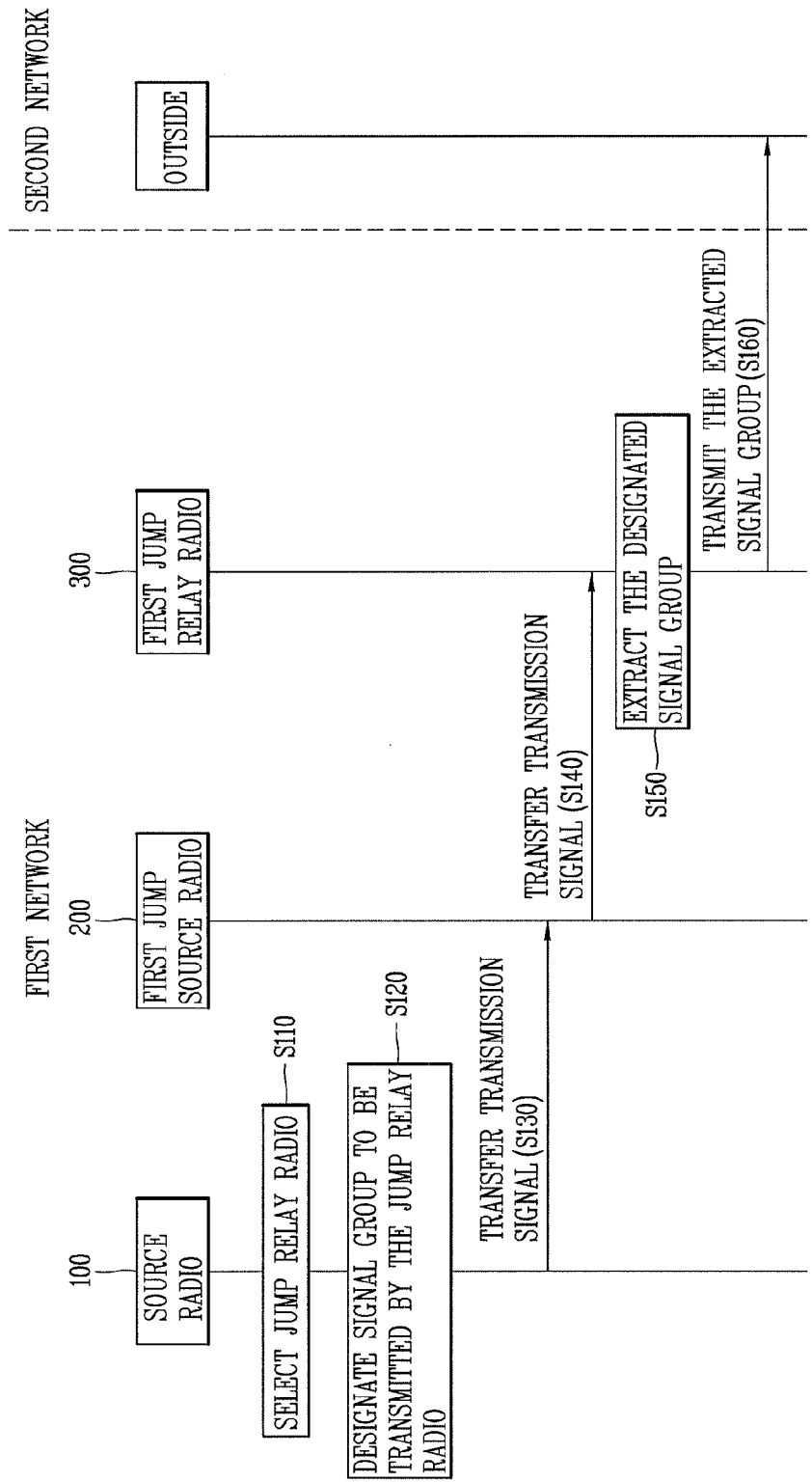
FIG. 1 is a flow chart illustrating a distributed transmission system according to the present disclosure.

Hereinafter, preferred embodiments of the present invention will be described in detail with reference to the accompanying drawings to such an extent that the present invention can be easily embodied by a person having ordinary skill in the art to which the present invention pertains. However, the present invention may be implemented in various different forms, and therefore, the present invention is not limited to the illustrated embodiments. In order to clearly describe the present invention, parts not related to the description are omitted, and like reference numerals designate like constituent elements throughout the specification.

FIG. 1 is a flow chart illustrating a distributed transmission system according to the present disclosure.

The distributed transmission system may include a source radio 100, a first jump source radio 200, and first jump relay radios 300. The source radio 100, the first jump source radio 200, and the first jump relay radios 300 may belong to the same network (hereinafter, referred to as a "first network").

Referring to FIG. 1, assuming that a transmission signal is divided into a plurality of signal groups, the process (S110) of allowing the source radio 100 to select the first jump relay radios 300 corresponding to the number of signal groups is carried out.

To this end, first, the source radio 100 may set up a link to an external network (hereinafter, referred to as a "second network"). Here, the source radio 100 may setup up a link to the second network or transmit data to the second network using orthogonal frequency division multiplexing (OFDM).

Here, orthogonal frequency division multiplexing refers to a mode in which a signal having a high transmission rate is divided into a large number of signal groups having a low transmission rate, and the divided signal groups are multiplexed using a plurality of subcarriers to transmit them at the same time.

Specifically, the source radio 100 may control all the first jump relay radios in the first network to try to connect to radios in the second network in a wireless manner using the transmission power of the first jump relay radios, respectively. At this time, since the second network is out of a distance range of the first network, the first jump relay radios in the first network should reduce their transmission speed by $\frac{1}{10}$-$\frac{1}{1000}$ to connect to radios in the second network in a wireless manner.

In general, when reducing the transmission speed, its energy is increased while increasing the transmission time, and thus the distance range is increased. Accordingly, some first jump relay radios 300 among the first jump relay radios in the first network may be connected to radios in the second network in a wireless manner. Here, the first jump relay radios 300 in the first network connected to radios within the second network transmit signal groups to the second network later.

When some of the first jump relay radios 300 in the first network are connected to radios in the second network, the process of allowing the source radio 100 of the first network and the destination radio (not shown) of the second network to send and receive address information to and from each other is carried out.

Next, the process (S120) of allowing the source radio 100 to designate signal groups to be sent by the first jump relay radios 300, respectively, is carried out.

Specifically, the source radio 100 may match a plurality of signal groups to the first jump relay radios 300, one to one, when the output transmission signal is inverse-multiplexed (or demultiplexed) into a plurality of signal groups. Here, multiplexing refers to a process of integrating two or more low level signals into one high level signal, and inverse multiplexing refers to an opposite process thereto.

Then, the process (S130) of allowing the source radio 100 to transfer a transmission signal to the first jump source radio 200 is carried out.

The first jump source radio 200 may transfer transmission signals received from the source radio 100 to the first jump relay radios 300 (S140).

On the other hand, though not shown in the drawing, the source radio 100 may substitute for the first jump source radio 200. Specifically, the source radio 100 may immediately transfer a transmission signal to the first jump relay radios 300.

Next, the process (S150) of extracting a predesignated signal group from the transmission signal received by the first jump relay radios 300 is carried out.

Specifically, the first jump relay radios 300 may extract only a predesignated signal group from the received transmission signal to intensively transmit only a predesignated signal group to the second network.

Then, the process (S160) of allowing the first jump relay radios 300 to transmit the extracted signal group to the second network is carried out.

Specifically, the first jump relay radios 300 may amplify the extracted signal group to transmit it to the second jump relay radios (not shown), respectively, in the second network. As a signal is transmitted through the first jump relay radios 300, transmission power increases as many as the number of the first jump relay radios 300. Due to this, the signal may be transmitted to the second network containing the destination radio (not shown) out of the distance range of the first network.

On the other hand, the signal group transmission speeds of the first jump relay radios 300 may be all the same, all different or only some of them the same.

As described above, according to a distributed transmission system according to an embodiment of the present disclosure may transmit a plurality of signal groups to the second network using the first jump relay radios 300 in the first network, thereby summing each transmission power of the first jump relay radios 300. As a result, it may be possible to enhance a distance range of the first network.

Accordingly, a signal may be transmitted to the second network out of the distance range using a plurality of low power radios even without using a high power radio in the first network.

Figure 2:
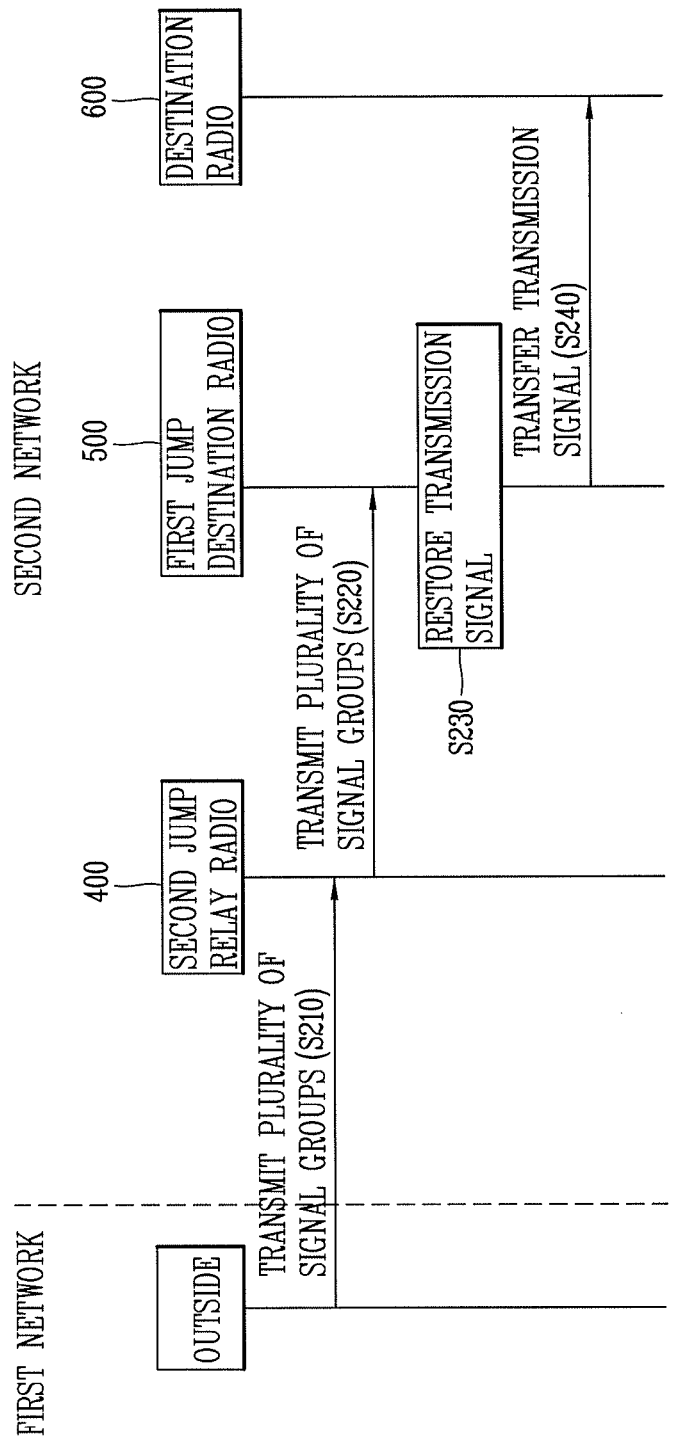
FIG. 2 is a flow chart illustrating a distributed reception system according to the present disclosure.

FIG. 2 is a flow chart illustrating a distributed reception system according to the present disclosure.

The distributed reception system may include a second jump relay radios 400, a first jump destination radio 500, and a destination radio 600. The second jump relay radios 400, the first jump destination radio 500 and the destination radio 600 may belong to the same network (hereinafter, referred to as a "second network").

Referring to FIG. 2, the process (S210) of allowing the second jump relay radios 400 to receive a plurality of signal groups from an external network (hereinafter, referred to as a "first network") is carried out.

Specifically, the second jump relay radios 400 may be selected as second jump relay radios having an excellent reception characteristic to a wireless signal transmitted from the first network among the second jump relay radios belonging to the second network.

Next, the process (S220) of allowing the second jump relay radios 400 to transfer a plurality of signal groups, respectively, to the first jump destination radio 500 is carried out.

Then, the process (S230) of allowing the first jump destination radio 500 that has received the plurality of signal groups to restore the transmission signal is carried out. Specifically, the first jump destination radio 500 may combine the received signal groups to restore the transmission signal.

Next, the process (S240) of allowing the first jump destination radio 500 to transfer the restored transmission signal to the destination radio 600 is carried out. Accordingly, the transmission signal is transmitted to the destination radio 600 of the second network from the source radio (not shown) of the first network.

On the other hand, though not shown in the drawing, the destination radio 600 may substitute for the first jump destination radio 500. Specifically, the second jump relay radios 400 may immediately transfer a plurality of signal groups to the destination radio 600. At this time, signal groups may be combined in the destination radio 600 to restore the transmission signal.

As described above, a distributed reception system according to an embodiment of the present disclosure may restore a plurality of signal groups received from the first network to receive the transmission signal even when located out of a distance range of the first network to which the source radio belongs.

Figure 3:
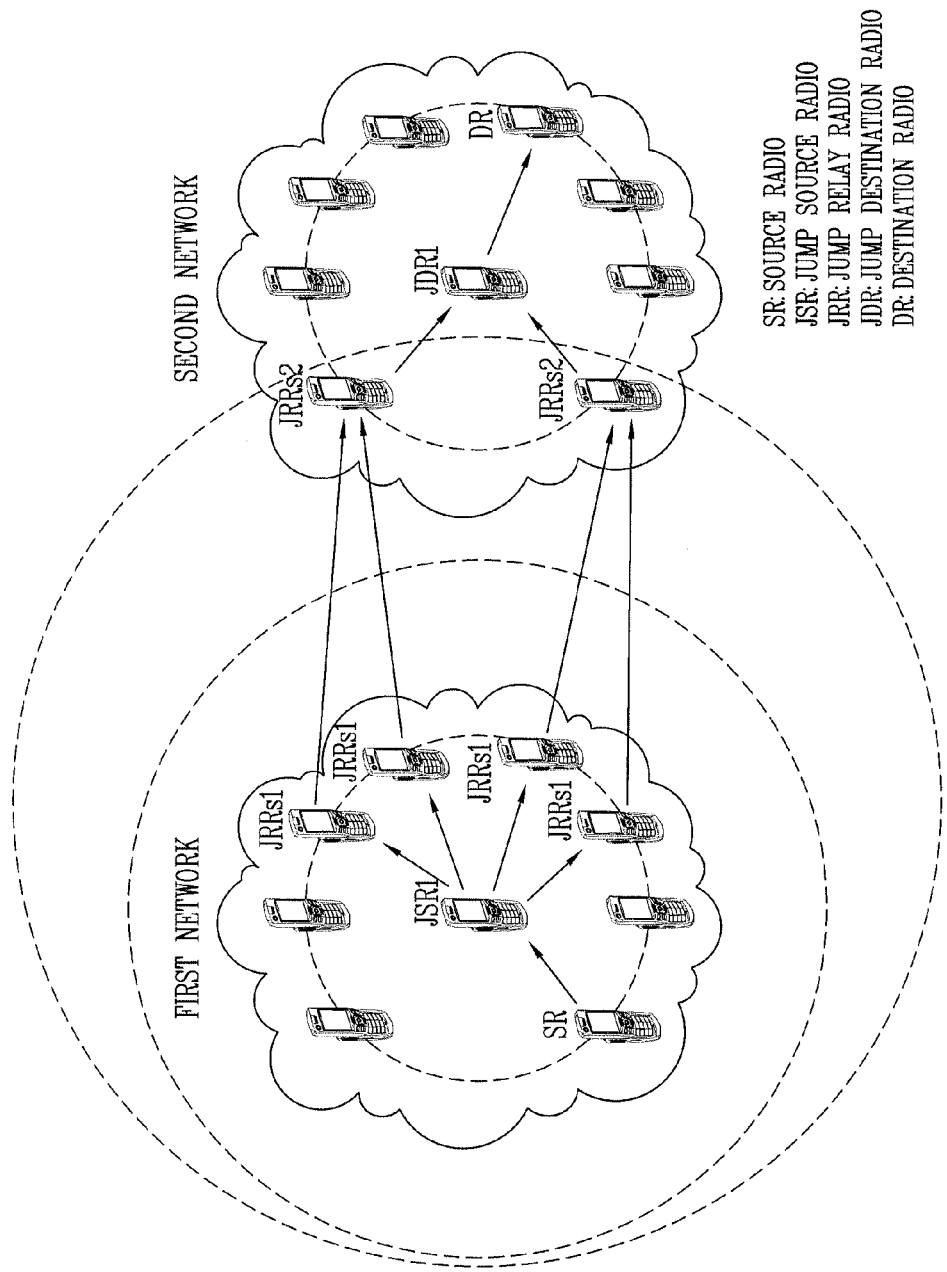
FIG. 3 is a conceptual view illustrating a distributed transmission system according to FIG. 1 and a distributed reception system according to FIG. 2.

FIG. 3 is a conceptual view illustrating a distributed transmission system according to FIG. 1 and a distributed reception system according to FIG. 2.

The distributed transmission system may include a source radio (SR), a first jump source radio (JSR1) and first jump relay radios (JRRs1). The source radio (SR), the first jump source radio (JSR1) and the first jump relay radios (JRRs1) may belong to the same network (hereinafter, referred to as a "first network").

Furthermore, the distributed reception system may include second jump relay radios (JRRs2), a first jump destination radio (JDR1) and a destination radio (DR). The second jump relay radios (JRRs2), the first jump destination radio (JDR1) and the destination radio (DR) may belong to the same network (hereinafter, referred to as a "second network").

Referring to FIG. 3, the source radio (SR) may transfer a transmission signal to the first jump source radio (JSR1). Here, though not shown in the drawing, assuming that the transmission signal is divided into a plurality of signal groups, the source radio (SR) may select the first jump relay radios (JRRs1) of the first network corresponding to the number of signal groups, and designate a signal group to be transmitted by the first jump relay radios (JRRs1), respectively.

Next, the first jump source radio (JSR1) may transfer a transmission signal received from the source radio (SR) to the first jump relay radios (JRRs1).

Then, the first jump relay radios (JRRs1) may extract a predesignated signal group from the transmission signal received from the first jump source radio (JSR1), and transmit the extracted signal group to the second jump relay radios (JRRs2) of the second network, respectively.

The second jump relay radios (JRRs2) of the second network may transfer the received signal groups, respectively, to the first jump destination radio (JDR1).

Next, the first jump destination radio (JDR1) may combine signal groups received from the second jump relay radios (JRRs2) to restore the transmission signal. The first jump destination radio (JDR1) may transmit the restored transmission signal to the destination radio (DR).

Accordingly, a transmission signal output from the source radio (SR) of the first network may be transferred to the destination radio (DR) of the second network.

Figure 4:
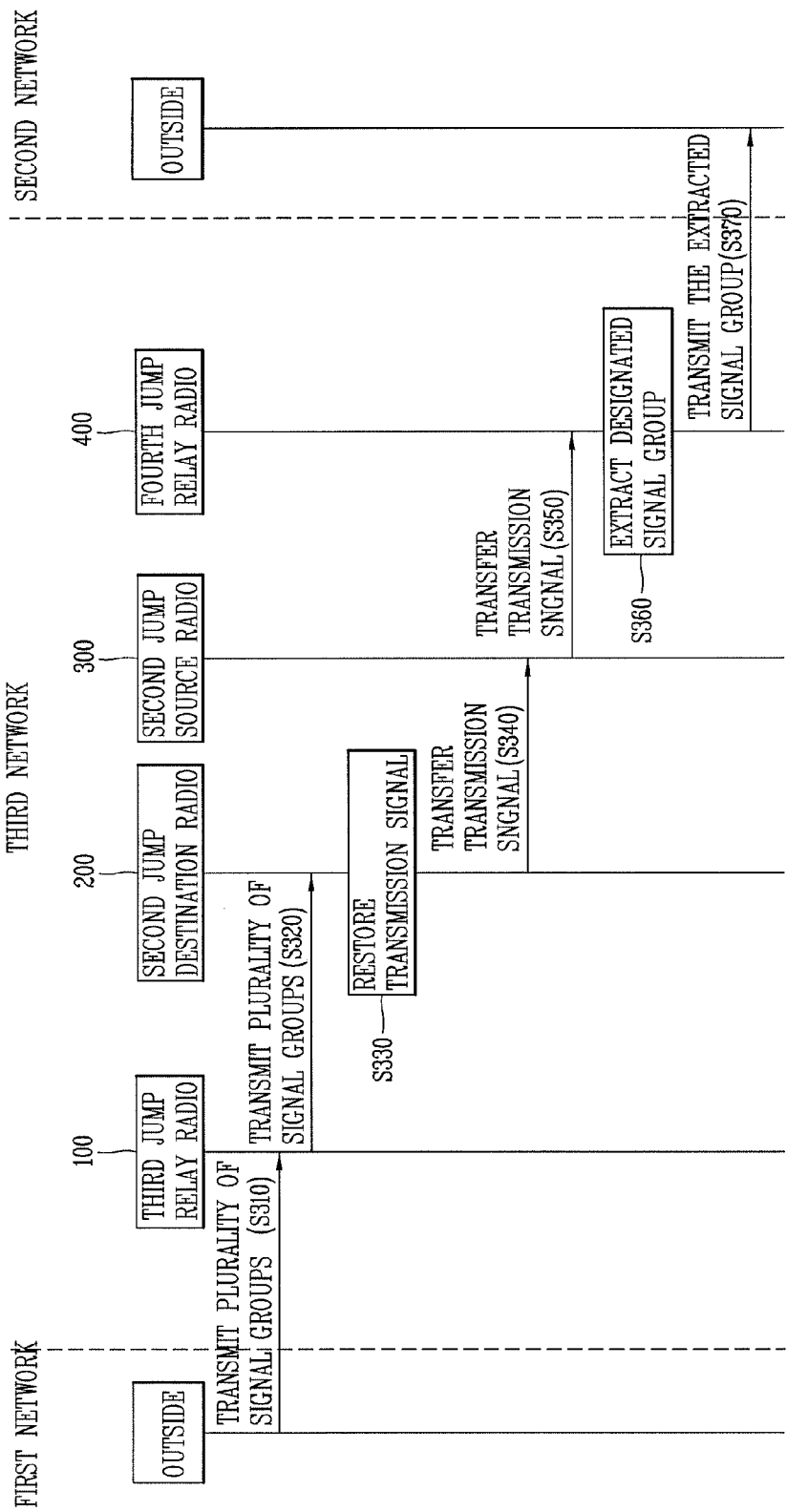
FIG. 4 is a flow chart illustrating a distributed relay system using a distributed transmission and reception system according to the present disclosure.

FIG. 4 is a flow chart illustrating a distributed relay system using a distributed transmission and reception system according to the present disclosure.

The distributed relay system may include third jump relay radios 100, a second jump destination radio 200, a second jump source radio 300 and a fourth jump relay radios 400. The third jump relay radios 100, the second jump destination radio 200, the second jump source radio 300 and the fourth jump relay radios 400 may belong to the same network (hereinafter, referred to as a "third network").

Referring to FIG. 4, the process (S310) of allowing the third jump relay radios 100 to receive a plurality of signal groups, respectively, from an external network (hereinafter, referred to as a "first network") is carried out.

Next, the process (S320) of allowing the third jump relay radios 100 to transfer a plurality of signal groups, respectively, to the second jump destination radio 200 is carried out.

Then, the process (S330) of allowing the second jump destination radio 200 that has received a plurality of signal groups to restore a transmission signal is carried out. Specifically, the second jump destination radio 200 may combine the received signal groups to restore a transmission signal.

Next, the process (S340) of allowing the second jump destination radio 200 to transfer the restored transmission signal to the second jump source radio 300 is carried out.

The second jump source radio 300 may transfer the transmission signal received from the second jump destination radio 200 to the fourth jump relay radios 400 (S350).

Next, the process (S360) of allowing the fourth jump relay radios 400 to extract a predesignated signal group from the received transmission signal is carried out.

Then, the process (S370) of allowing the fourth jump relay radios 400, respectively, to transmit the extracted signal group to an external network (hereinafter, referred to as a "second network") is carried out.

Specifically, the fourth jump relay radios 400 may amplify the extracted signal group to transmit it to the second jump relay radios (not shown), respectively, within the second network.

As described above, a source radio contained in the first network may transmit a signal to a destination radio (not shown) in the second network out of the distance range of the first and the second network using radios within the third network.

Figure 5:
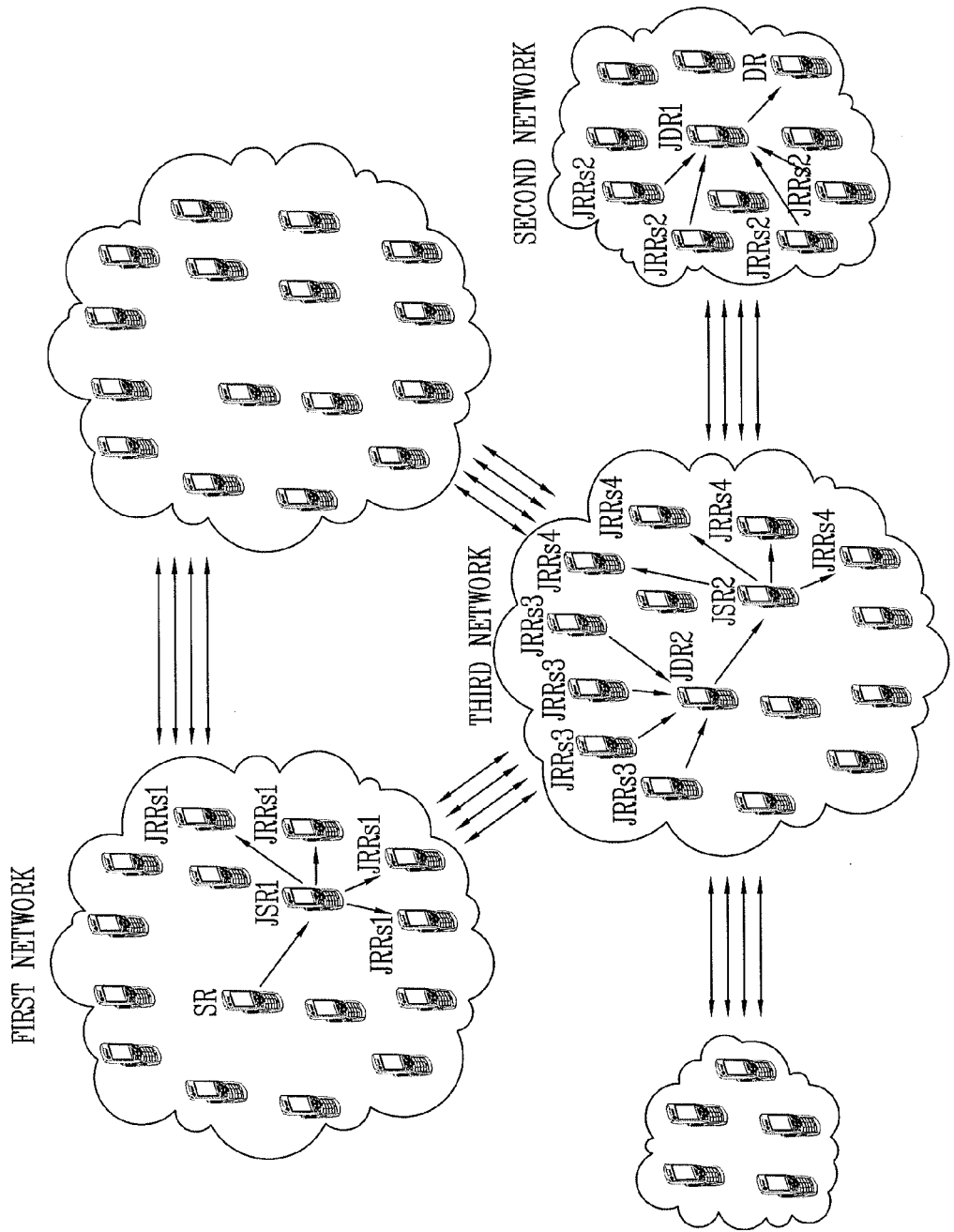
FIG. 5 is a conceptual view illustrating an expanded wireless network using a distributed relay system according to FIG. 4.

FIG. 5 is a conceptual view illustrating an expanded wireless network using a distributed relay system according to FIG. 4.

The distributed relay system may include third jump relay radios (JRRs3), a second jump destination radio (JDR2), a second jump source radio (JSR2), and fourth jump relay radios (JRRs4). The third jump relay radios (JRRs3), the second jump destination radio (JDR2), the second jump source radio (JSR2), and the fourth jump relay radios (JRRs4) may belong to the same network (hereinafter, referred to as a "third network").

Referring to FIG. 5, a source radio (SR) in the first network may output a transmission signal to a first jump source radio (JSR1) in the first network to transmit the transmission signal to a destination radio (DR) in the second network. The output transmission signal may be divided into a plurality of signal groups, and transmitted to third jump relay radios (JRRs3) in the third network through first jump relay radios (JRRs1).

The third jump relay radios (JRRs3) may transfer the received signal groups, respectively, to the second jump destination radio (JDR2).

Next, the second jump destination radio (JDR2) may combine the signal groups received from the third jump relay radios (JRRs3) to restore a transmission signal. The second jump destination radio (JDR2) may transfer the restored transmission signal to the second jump source radio (JSR2).

Then, the second jump source radio (JSR2) may transfer the restored transmission signal received from the source radio (SR) to the fourth jump relay radios (JRRs4), respectively.

Next, the fourth jump relay radios (JRRs4) may extract a predesignated signal group from the restored transmission signal received from the second jump source radio (JSR2), and transmit the extracted signal group to the second jump relay radios (JRRs2), respectively, in the second network.

Signal groups received from the second jump relay radios (JRRs2) in the second network may be restored from the first jump destination radio (JDR1) in the second network, and transferred to the destination radio (DR).

Accordingly, the source radio (SR) in the first network may transfer a transmission signal to the destination radio (DR) in the second network using radios in the third network.

As described above, when a distributed transmission system and a distributed reception system are carried out within one network, a distributed relay system may be established. The distributed relay system may relay a signal that has been received from another network to still another network, thereby expanding a wireless network region.

The configurations and methods according to the above-described embodiments will not be applicable in a limited way to the foregoing distributed transmission and reception system and expanded wireless network using the same, and all or part of each embodiment may be selectively combined and configured to make various modifications thereto.

The invention claimed is:

1. A distributed relay system, comprising:
   third jump relay radios configured to receive a plurality of signal groups from first jump relay radios in a first network;
   a second destination radio configured to receive the plurality of signal groups, respectively, from the third jump relay radios to restore a transmission signal using the received signal groups;
   a second jump source radio configured to receive the restored transmission signal from the second destination radio; and
   fourth jump relay radios configured to receive the transmission signal from the second jump source radio, extract a predesignated signal group from the transmission signal, and transmit the extracted signal group to an external network containing each destination radio.

2. The distributed relay system of claim 1, wherein the second destination radio, the second jump source radio, the third and fourth jump relay radios belong to the same network.

3. The distributed relay system of claim 1, wherein the second jump source radio receives the transmission signal in a form that the signal groups are restored.

4. An expanded wireless network, comprising:
   a distributed relay system including: a distributed relay system, comprising:
   third jump relay radios configured to receive a plurality of signal groups from first jump relay radios in a first network;
   a second destination radio configured to receive the plurality of signal groups, respectively, from the third jump relay radios to restore a transmission signal using the received signal groups;
   a second jump source radio configured to receive the restored transmission signal from the second destination radio; and
   fourth jump relay radios configured to receive the transmission signal from the second jump source radio, extract a predesignated signal group from the transmission signal, and transmit the extracted signal group to an external network containing each destination radio.

5. The expanded wireless network of claim 4, wherein the distributed transmission is connected to a wireless network separated therefrom using radios.

6. The expanded wireless network of claim 4, further comprising:
   a source radio corresponding to the number of signal groups when the transmission signal is divided into a plurality of signal groups, and designate a signal group to be transmitted by the first jump relay radios, respectively; and
   the first jump relay radios are configured to extract the designated signal group from the transmission signal output out of the source radio, and transmit the extracted signal group to an external network containing each destination radio.

7. The expanded wireless network of claim 6, wherein the source radio sets up a link to the external network containing the destination radio, and exchanges an address with the destination radio.

8. The expanded wireless network of claim 7, wherein the source radio sets up a link to the external network or transmits data to the external network using orthogonal frequency division multiplexing (OFDM).

9. The expanded wireless network of claim 6, wherein the first jump relay radios amplify the extracted signal groups, respectively, to transmit them to the external network containing the destination radio.

10. The expanded wireless network of claim 6, further comprising:
   second jump relay radios configured to receive a plurality of signal groups from the outside;
   a first destination radio configured to receive the plurality of signal groups, respectively, from the second jump relay radios to restore a transmission signal using the received signal groups; and
   a destination radio configured to receive the restored transmission signal from the first jump destination radio.

11. The expanded wireless network of claim 10, wherein the destination radio, the first jump destination radio and the second jump relay radios belong to the same network.

12. The expanded wireless network of claim 10, wherein the first jump destination radio combines the received signal groups to restore the transmission signal.

13. The expanded wireless network of claim 4, further comprising:
   a first jump source radio configured to receive the transmission signal from the source radio, and transfer the transmission signal to the first jump relay radios.

14. The expanded wireless network of claim 13, wherein the source radio, the first jump source radio and the first jump relay radios belong to the same network.

* * * * *